INVENTOR:
H.W. MULKINS

BY: Edwin D. Grant
ATTORNEY

INVENTOR:
H.W. MULKINS

BY: Edwin D. Grant
ATTORNEY

Nov. 1, 1966 H. W. MULKINS 3,282,538
EJECTION DEVICE

Filed Aug. 16, 1965 6 Sheets-Sheet 5

INVENTOR:
H.W. MULKINS

BY: Edwin D. Grant
ATTORNEY

United States Patent Office 3,282,538
Patented Nov. 1, 1966

3,282,538
EJECTION DEVICE
Herbert W. Mulkins, Newark, Del., assignor to Thiokol Chemical Corporation, Bristol, Pa., a corporation of Delaware
Filed Aug. 16, 1965, Ser. No. 479,953
5 Claims. (Cl. 244—122)

This invention relates to an ejection device and, more particularly, to a device for ejecting a seat or other structure from a high speed aircraft in an emergency.

Many ejection devices have previously been designed which utilize a rocket motor as propulsion means for extending the distance that a seat is carried after it is ejected from a high speed vehicle, such as, for example, a jet powered airplane. In such systems the rocket motor is generally fixedly attached to the seat to be ejected, and the thrust nozzle of the rocket motor is canted at a fixed angle relative to the casing thereof so that the line of thrust of the rocket motor passes through or near the center of gravity of the ejected mass. Heretofore such fixedly canted thrust nozzles have been made small enough to fit in the catapult tubes which are ordinarily incorporated in rocket propelled seat ejection systems, which arrangement necessitates that the aforementioned thrust nozzles have a maximum diameter smaller than the diameter of the catapult tubes in which they are held. Since the thrust of a rocket motor depends upon the expansion ratio of its thrust nozzle (i.e., the ratio of nozzle throat area to nozzle exit area), the size limitation thus imposed upon the exit diameter of a thrust nozzle of fixedly canted design adversely affects the performance of an ejection device employing a rocket motor.

It is accordingly an object of this invention to provide an improved seat ejection device of the type which utilized a rocket motor as propulsion means.

An additional object of the invention is to provide an uncomplicated and effective seat ejection device of the rocket motor-catapult tube type in which the thrust nozzle of the rocket motor is canted to a predetermined position relative to the casing of the rocket motor after the latter emerges from its catapult tube.

Another object of this invention is to provide a seat ejection device of the type utilizing a rocket motor positioned within a catapult tube, in which device the exit diameter of the thrust nozzle of the rocket motor is substantially equal to the inside diameter of the catapult tube.

These objects of the invention will be more readily understood by consideration of the following description of two embodiments of the invention, in which reference is made to the accompanying drawings, wherein.

Throughout the specification and drawings like reference numbers refer to like parts.

Figure 1:
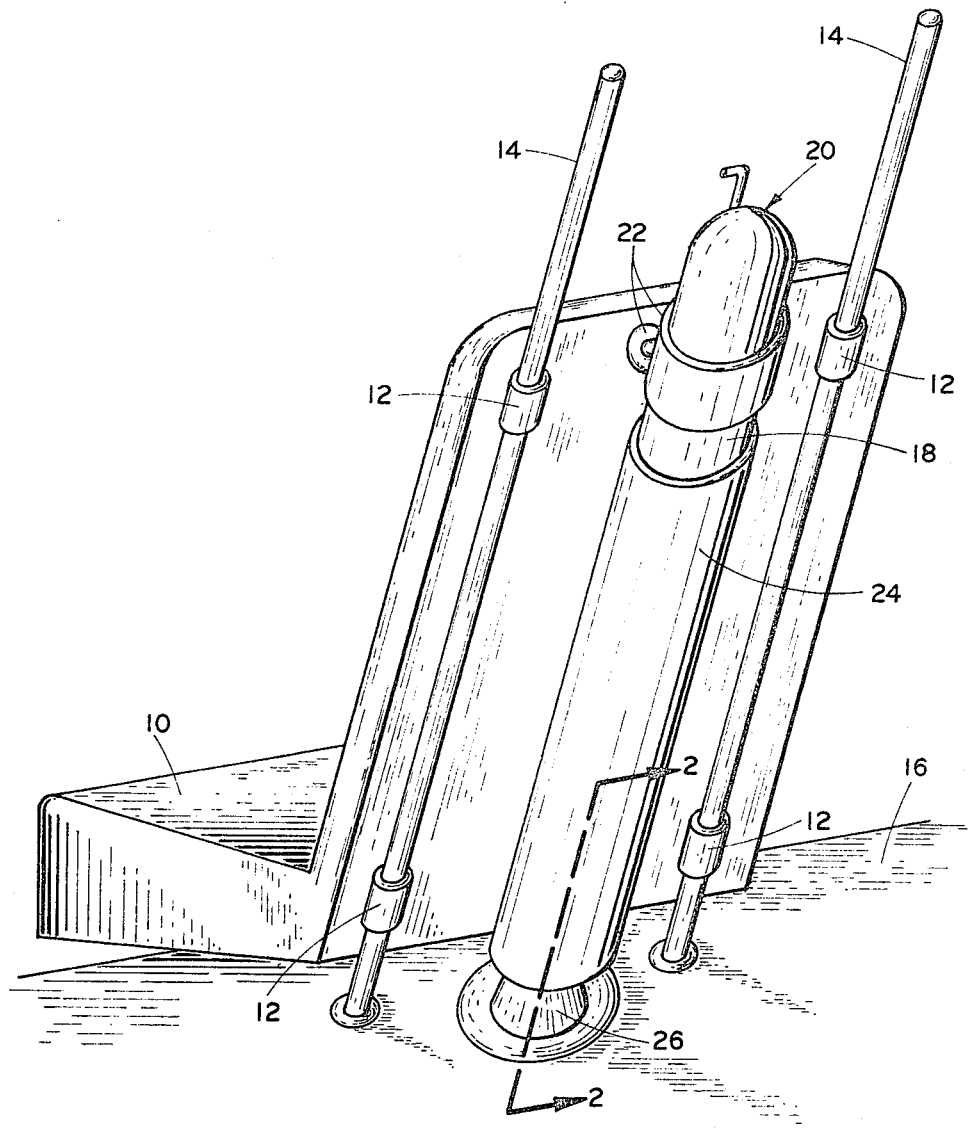
FIGURE 1 is a pictorial view of a seat ejection device constituting a preferred embodiment of the invention, illustrating the arrangement of components thereof before the device is actuated.
Figure 2:
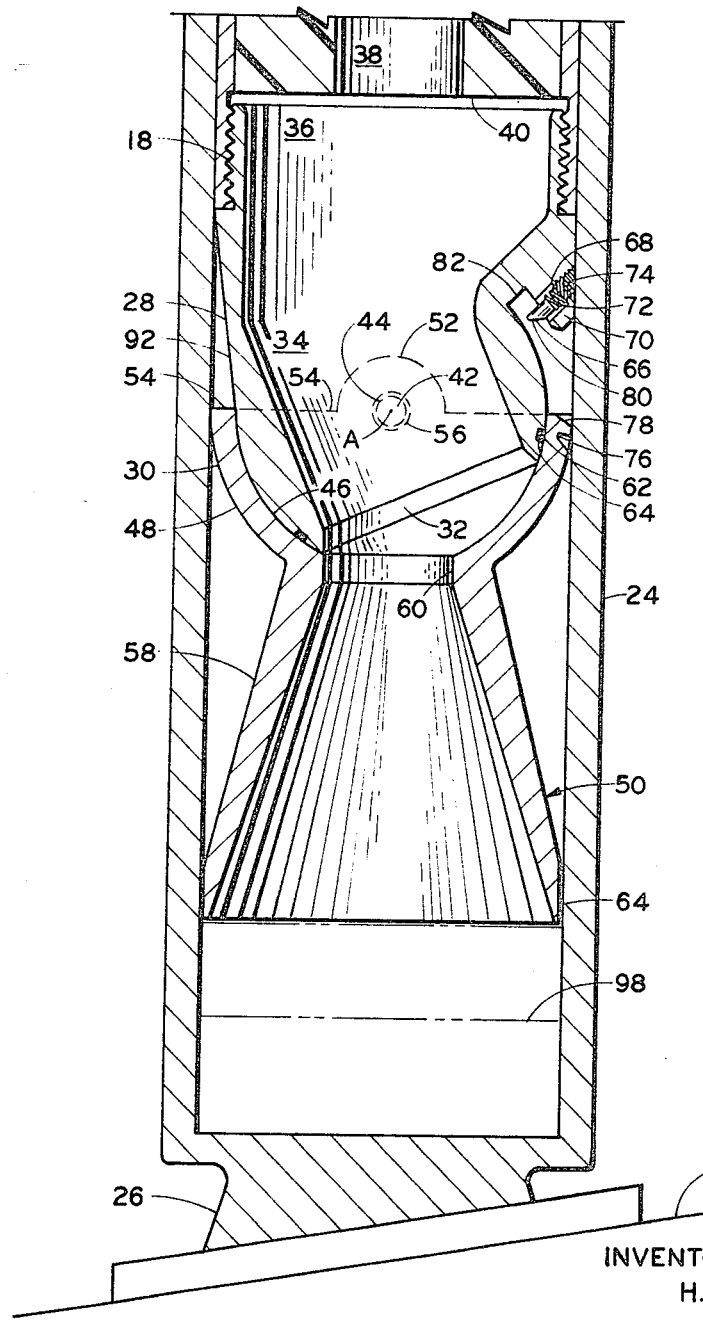
FIGURE 2 is a fragmentary sectional view of components of the preferred embodiment, taken along the plane represented by line 2—2 of FIG. 1.

FIG. 1 illustrates a seat ejection device comprising a seat 10 that has four tubular mounts 12 fixedly connected to the back thereof, pairs of said mounts being slidably engaged with a respective one of two tubular guide rails 14 the lower ends of which are respectively fixedly secured to a platform 16 of a high-speed vehicle, such as, for example, a jet powered airplane. The forward end of the casing 18 of a rocket motor, generally designated by the number 20, is fixedly connected to seat 10 by means of a connector assembly 22, and the aft end of said casing is slidably engaged within a cylindrical catapult tube 24 one end of which is fixedly connected to platform 16 by means of a stanchion 26. As illustrated in FIG. 2, the aft portion of the wall of casing 18 is threadedly engaged with the wall of a hollow nozzle support, generally designated by the number 28, which for the purpose of interpretation of appended claims to the invention is to be considered as part of casing 18. The outer, aft end surface 30 of nozzle support 28 is spherical, i.e., all points thereon are equidistant from a point A located on the longitudinal axis of casing 18. Nozzle support 28 is provided with an aperture 32 the axis of which lies in a plane which includes the longitudinal axis of casing 18. As can be seen in the drawing, the axis of aperture 32 is disposed oblique to the longitudinal axis of casing 18. The interior 34 of nozzle support 28 is in communication with the interior 36 of casing 18 and thus also in communication with a perforation 38 formed in a combustible grain 40 of solid propellant fixedly disposed within said casing. Two pivots 42 (only one of which is designated in the drawing) are respectively fixedly positioned, as by means of a forced fit, in coaxial, outwardly-facing holes 44 (one of which is illustrated in the drawing by the broken line which outlines pivot 42) respectively formed in diametrically-opposed portions of the wall of nozzle support 28. Each pivot 42 projects outwardly from the outer surface 30 of nozzle support 28, and the common axis of said holes 44 and pivots 42 is disposed perpendicular to both the longitudinal axis of casing 18 and the longitudinal axis of aperture 32. The inner surface of a generally hemispherical first portion 48 of a thrust nozzle, generally designated by the number 50, is positioned against surface 30 of nozzle support 28, said first portion of said thrust nozzle being provided with two semicircular lugs 52 (one of which is illustrated by a broken line in the drawing) which are integral with the wall of said first portion and which extend from the planar, forward edge 54 thereof. Two coaxial apertures 56 (one of which is illustrated in the drawing by a broken line which, for the purpose of clarity, is spaced an exaggerated distance from the line that outlines pivot 42 and represents hole 44) respectively extend through diametrically-opposed portions of the wall of first portion 48 of thrust nozzle 50, and, more specifically, through lugs 52. The diameter of each aperture 56 is slightly greater than the diameter of pivots 42 so that when the pivots 42 are respectively positioned within apertures 56 thrust nozzle 50 is pivotally connected to nozzle support 28.

A second portion 58 of thrust nozzle 50 is integrally joined to said first portion 48 thereof, the wall of this second portion forming a hollow truncated cone the smaller end of which circumscribes an aperture 60 centrally located in said first portion 48. More particularly, when thrust nozzle 50 is positioned within catapult tube 24 as illustrated in FIG. 2, its longitudinal axis is substantially coincident with the longitudinal axis of casing 18. Pivots 42 allow thrust nozzle 50 to pivot from the position thereof illustrated in FIG. 2 to the position thereof illustrated in FIG. 4, wherein said thrust nozzle is canted with respect to casing 18 and the aperture 60 is in registry with aperture 32 in nozzle support 28. It can also be seen in FIG. 2 that surfaces 30 and 46 of nozzle support 28 and thrust nozzle 50 respectively are sealed by means of an O-ring 62 positioned within a groove 64 extending about the outer surface of said nozzle support adjacent the aft edge of the aperture 32 therein.

The aft end of thrust nozzle 50 is chamfered so that the end surface 64 of the wall thereof is cylindrical and coaxial with the lnngitudinal axis of said thrust nozzle, i.e., all points on said surface are equidistant from said longitudinal axis of said thrust nozzle. Surface 64 of thrust nozzle 50 is slidably engaged with the inner surface of catapult tube 24 when casing 18 is positioned in said catapult tube. Thus the exit diameter of thrust nozzle 50 is substantially equal to the inside diameter of catapult tube 24.

A latch pin 66 is slidably engaged within an aperture 68 formed in a boss 70 that is an integral part of nozzle support 28, said latch pin being biased toward the surface 30 of said nozzle support by means of a helical spring 72 positioned between the latch pin and a set screw 74 threadedly engaged within said aperture 68. Thrust nozzle 50 is provided with a detent hole 76 that is formed in portion 48 thereof. The axes of aperture 68 and detent hole 76 lie in a plane disposed perpendicular to the axis of pivots 42. A chamfered surface 78 is formed on the forward end of thrust nozzle 50 adjacent boss 70, this surface engaging a chamfered surface 80 formed on latch pin 66 when the thrust nozzle is rotated about pivots 42 and causing the latch pin to depress in the aperture 68 in which it is positioned. When the forward end surface 54 of thrust nozzle 50 contacts a stop surface 82 formed on nozzle support 28, latch pin 66 registers with detent hole 76 and slides into the latter to lock thrust nozzle 50 in a canted position determined by the location of said stop surface and latch pin.

Figure 3:
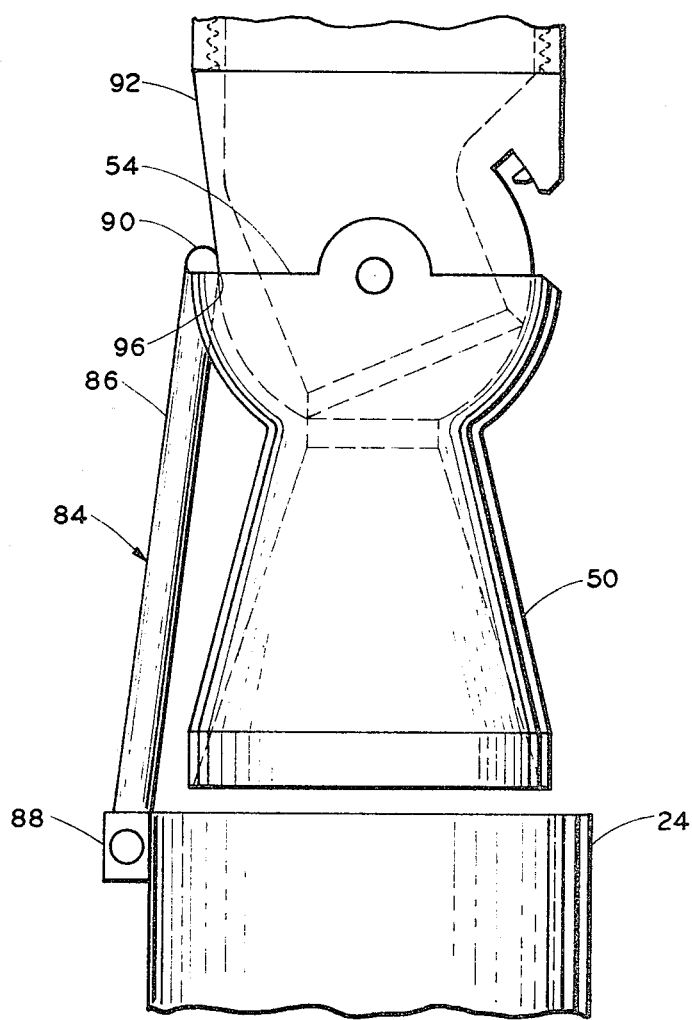
FIGURE 3 is a fragmentary view of components of the preferred embodiment as they appear after the rocket motor thereof has emerged from its catapult tube.
Figure 4:
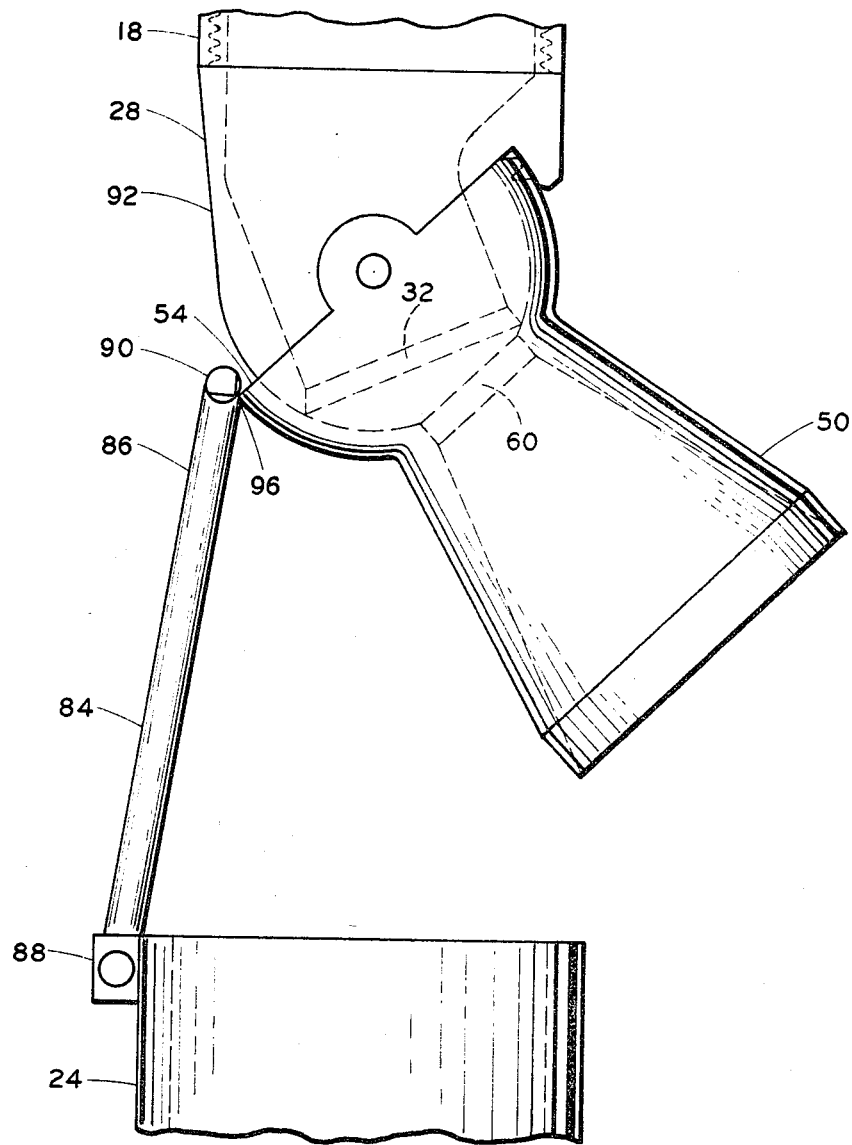
FIGURE 4 is a fragmentary view of components of the preferred embodiment after the thrust nozzle of the rocket motor thereof has been canted.
Figure 5:
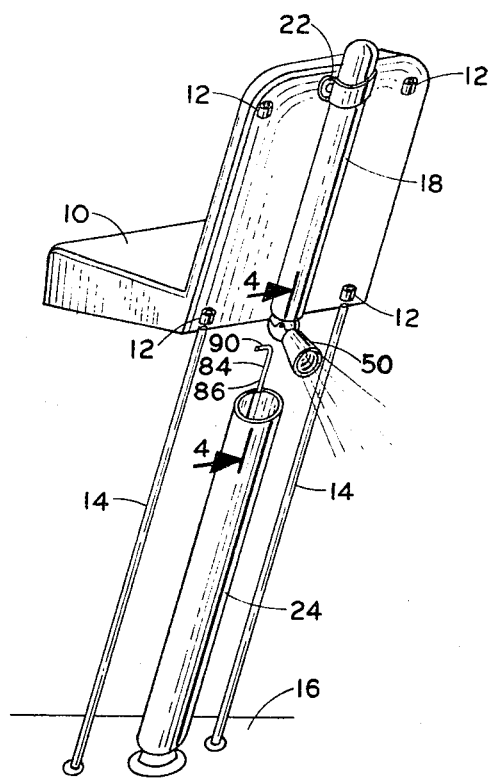
FIGURE 5 is a pictorial view of the preferred embodiment after the seat thereof has separated from its guide rails.

In FIG. 3 is illustrated a deflector, generally designated by the number 84, in the form of a torsion bar comprising a first portion 86 that is fixedly held in a bracket 88 attached to the free end of catapult tube 24, and a second portion 90 that is disposed substantially perpendicular to the longitudinal axis of the catapult tube. Deflector 84 normally extends to the right of its illustrated position in FIG. 3 and therefore must be forced away from the longitudinal axis of catapult tube 24 as the rocket motor is being placed in said catapult tube. As casing 18 slides up the catapult tube after the seat ejection device has been actuated, the rounded forward end of the casing contacts the second portion 90 of deflector 84 and said second portion 90 slides on the casing and the cam surface 92 on nozzle support 28. After thrust nozzle 50 of the rocket motor has emerged from the catapult tube the forward end surface 54 of said thrust nozzle contacts the second portion 90 of the deflector, forcing the thrust nozzle to rotate. The length of the first portion 86 of the deflector is such that the edge 96 formed on the second portion 90 thereof remains in contact with the forward end surface 54 of the thrust nozzle until latch pin 66 enters detent hole 76. FIG. 4 illustrates the relation of deflector 84 and thrust nozzle 50 immediately before these components disengage. As illustrated in FIG. 5, the length of guide rails 14 is such that the mounts 12 located adjacent the bottom of seat 10 are still engaged with the guide rails when thrust nozzle 50 disengages from deflector 84, thus preventing lateral movement of the rocket motor while the thrust nozzle is rotating to its canted position.

The described preferred embodiment of the invention is provided with conventional means (not shown) adapted to hold casing 18 in the position illustrated in FIG. 1 until the seat ejection device is actuated. Conventional means are also provided to catapult the rocket motor from catapult tube 24 and to ignite the combustible grain 40 of the rocket motor after the latter has emerged from the catapult tube. Since such means for imparting an initial velocity to the rocket motor of a seat ejection system and for igniting the propellant of said rocket motor are well-known in the art and do not constitute a part of the present invention, for the sake of simplicity only a catapult piston 98 is illustrated by a broken line in FIG. 2.

It will be understood from the foregoing description that the direction of thrust of the rocket motor 20 relative to seat 10 can conveniently be varied by changing the location of stop surface 82 and latch pin 66 on nozzle support 28. Furthermore, in the preferred embodiment of the invention the exit diameter of thrust nozzle 50 is substantially equal to the inside diameter of catapult tube 24, whereas in conventional rocket propelled seat ejection devices utilizing fixedly canted thrust nozzles the exit diameter of said thrust nozzles is less than the inside diameter of the catapult tubes employed therewith. Thus the preferred embodiment of the invention provides uncomplicated means for canting the thrust nozzle of the rocket motor of a seat ejection device so that its line of thrust is directed at a predetermined angle relative to the seat and mass associated therewith, and also provides a higher nozzle expansion ratio than is obtained in the aforementioned seat ejection devices employing rocket motors having fixedly canted thrust nozzles.

Figure 6:
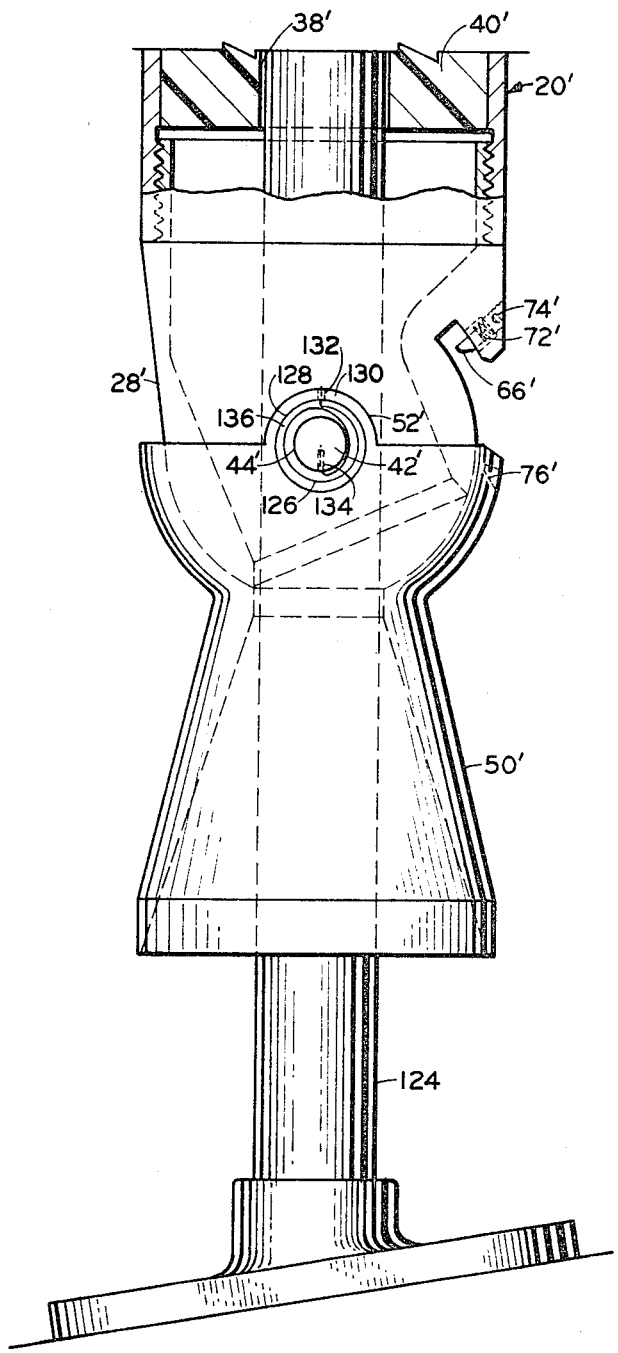
FIGURE 6 is a fragmentary, partially sectional view of a component of a second embodiment of the invention.

FIG. 6 illustrates a modification of the above-described seat ejection device. It is to be understood that this second embodiment of the invention comprises a seat that is fixedly connected to the forward end of the rocket motor 20′ and guide rails on which said seat is slidably mounted, these components being omitted in the drawing for the sake of simplicity. Rocket motor 20′ is provided with a nozzle support 28′, pivots 42′ (only one of which is shown), a thrust nozzle 50′, and thrust nozzle locking components 66′, 72′, 74′ all of which correspond in structure and function to components of the preferred embodiment designated by like numbers without a prime mark. However, the second embodiment of the invention utilizes a catapult tube 124 that extends through the orifice of thrust nozzle 50′ and into a perforation 38′ formed in the combustible grain 40′ of the rocket motor. This type of internal catapult tube will be well-known to persons skilled in the art of seat ejection devices, and therefore, its construction and manner of operation will not be explained herein. Rotation of thrust nozzle 50′ about pivots 42′ is effected, after the thrust nozzle disengages from catapult tube 124, by means of a spiral spring 126 positioned within a recess 128 formed in the thrust nozzle in concentric relation with one of the pivots 42′. Recess 128 defines an outwardly-extending shoulder 130 on the lug 52′ adjacent thereto, one end of spring 126 being disposed in an aperture 132 (which is illustrated in the drawing by broken lines) that extends through said shoulder 130 and the other end of said spring being disposed in a hole 134 (which is formed in the end of the pivot 42′ that projects outwardly from the bottom surface 136 of the recess. Spring 126 biases thrust nozzle 50′ in the direction of latch pin 72′, which enters a detent hole 76′ formed in the thrust nozzle when the latter has rotated to its canted position. It will thus be obvious that the aforementioned advantages of the preferred embodiment of the invention are also obtained by the second embodiment thereof.

While two forms which the present invention may take have been described and illustrated, it will be apparent to those skilled in the art to which the invention pertains that other embodiments may be made and practiced without departing from the spirit and scope of the invention, for the limits of which reference should be made to the subjoined claims.

What is claimed is:
1. In a device for ejecting a seat from an aircraft:
a catapult tube fixedly connected at one end thereof to said aircraft;
a rocket motor comprising a casing and a thrust nozzle pivotally mounted on the aft end of said casing, the forward end of said casing being fixedly connected to said seat and the aft end of said casing and said thrust nozzle being respectively positioned within said catapult tube;

means for pivoting said thrust nozzle relative to said casing after said rocket motor has been ejected from said catapult tube; and means for locking said thrust nozzle on said casing after it has pivoted to a predetermined canted position relative thereto, so that the line of thrust of said rocket motor is selectively positioned relative to the center of gravity of said seat and mass connected therewith.

2. The combination recited in claim 1 wherein:

said means for pivoting said thrust nozzle comprises a deflector fixedly positioned adjacent said catapult tube; and said thrust nozzle includes a surface adapted to strike said deflector after said rocket motor has been ejected from said catapult tube, thereby causing said thrust nozzle to pivot toward said predetermined position relative to said casing.

3. The combination recited in claim 1 wherein the exit diameter of said thrust nozzle is substantially equal to the inside diameter of said catapult tube.

4. In a device for ejecting a seat from a vehicle:

a catapult tube fixedly connected at one end thereof to said vehicle;

a rocket motor comprising a casing and a thrust nozzle pivotally mounted on the aft end of said casing, the forward end of said casing being fixedly connected to said seat and the aft end of said casing and said thrust nozzle being respectively positioned within said catapult tube, the exit diameter of said thrust nozzle being substantially equal to the inside diameter of said catapult tube;

a deflector fixedly spaced from the free end of said catapult tube and aligned so that said thrust nozzle makes contact therewith after said rocket motor emerges from said catapult tube, whereby said thrust nozzle is pivoted relative to said casing; and means for fixedly locking said thrust nozzle to said casing after it pivots to a selected angular position relative thereto.

5. In a device for ejecting a seat from a vehicle:

a cylindrical catapult tube connected at one end thereof to said vehicle;

a rocket motor comprising a cylindrical casing, a hollow nozzle support member attached to the aft end of said casing, a pair of diametrically-opposed pivots fixedly mounted on said nozzle support member and projecting outwardly therefrom, and a thrust nozzle pivotally connected to said pivots for pivotal motion relative to said nozzle support member, the interior of said nozzle support member being in communication with the interior of said casing, the aft end of said nozzle support member having a substantially spherical outer surface and including an aperture the axis of which is disposed oblique to the longitudinal axis of said casing, a first portion of said thrust nozzle having a spherical inner surface which is positioned against said spherical outer surface of said nozzle support member and including an aperture centrally located therein, a second integral portion of said thrust nozzle comprising a hollow truncated cone the smaller end of which circumscribes said aperture in said first portion thereof, said pivots being located on said nozzle support member so that said thrust nozzle can be pivoted to a position relative to said nozzle support member wherein said aperture in said first portion thereof registers with said aperture in said nozzle support member, the forward end of said casing being fixedly connected to said seat and the aft end of said casing and said thrust nozzle being respectively positioned within said catapult tube, the aft end surface of said thrust nozzle being chamfered so that it is cylindrical and coaxial with the longitudinal axis of said catapult tube, said aft end surface of said thrust nozzle being slidably engaged with the inner surface of said catapult tube;

a torsion bar fixedly mounted on the free end of said catapult tube, a first portion of said bar being disposed substantially parallel to the longitudinal axis of said catapult tube, and a second portion of said bar being disposed substantially perpendicular to said longitudinal axis of said catapult tube and aligned so that said thrust nozzle makes contact therewith after said rocket motor emerges from said catapult tube, whereby said thrust nozzle is pivoted relative to said nozzle support;

means for fixedly locking said thrust nozzle on said nozzle support after it has pivoted to a position relative thereto wherein said aperture in said first portion of said thrust nozzle registers with said aperture in said nozzle support member; and guide means fixedly connected at one end thereof to said vehicle, said seat being mounted on said guide means for movement in a direction parallel to the longitudinal axis of said catapult tube, the length of said guide means being such that said seat is guided thereby after said thrust nozzle contacts said bar.

No references cited.

MILTON BUCHLER, *Primary Examiner.*

B. BELKIN, *Assistant Examiner.*